UNITED STATES PATENT OFFICE.

CHARLES J. THATCHER, OF NEW YORK, N. Y.

PROCESS FOR PRODUCING SEPARATORS.

1,393,467.     Specification of Letters Patent.     Patented Oct. 11, 1921.

No Drawing.     Application filed December 13, 1918. Serial No. 266,535.

*To all whom it may concern:*

Be it known that I, CHARLES J. THATCHER, a citizen of the United States, and a resident of New York city, in the county of New York and State of New York, have invented certain new and useful Improvements in Processes for Producing Separators, of which the following is a specification.

The invention relates to a process for impregnating or filling the pores of porous materials which are to be used as separator members, such as diaphragms, diffusion walls or like structures. The invention has reference more especially to a process for providing separator members of a semi-permeable character, particularly suited for use in separating two liquids from each other as in an electrolytic cell and similar apparatus. These impregnated members afford a non-porous, more or less solid and homogeneous separator, partition or wall, serving to prevent, for all practical purposes, any transmission of fluids through them, but allowing the ions of fluids to migrate or diffuse freely therethrough to carry the electricity and effect the desired decompositions or combinations at the electrodes.

The particular material to be impregnated, or its size or shape, forms no part of the present invention, and said material may consist of any suitable porous substance which will form a proper skeleton, framework or container. For example, I have found as a patrcularly suitable material, "filtros," which is composed of grains of sand or crystalline silica, also, "alundum," which is composed of granular aluminum oxid. Such materials, composed of granular aggregates having more or less uniform interstices, are admirably suited for the purpose, and are generally preferable to those composed of fibrous or cellular materials. However, wood, asbestos and various other materials may be employed to provide a suitable skeleton, frame-work or wall to retain the impregnating material.

Heretofore, it has been the practice, in impregnating materials for the purpose stated, to perform the process in two steps—the first consisting in saturating the porous materials as by soaking in an aqueous solution of a salt of a metal which is capable of forming a gelatinous or colloidal hydrate. The second step consisted in immersing the thus treated material in a solution of a suitable precipitating agent, as a hydrate. In other cases, the material was first saturated with a solution of sodium silicate, and, secondly, immersed in dilute sulfuric acid or other acid to cause a precipitation of gelatinous silica hydrate within the voids. Methods of producing separator members in manner similar to those hereinbefore recited are more particularly set forth in a co-pending application Serial No. 16285, filed by me the 22nd day of March, 1915.

I have found, however, that a much more satisfactory impregnation may be afforded by the process hereinafter described and claimed, particularly in that the impregnating material will be uniformly distributed and the impregnation effected more economically and expeditiously. In the processes heretofore practised, diffusion of the precipitating liquid into the diaphragm material was retarded and the gelatinous material more or less unequally distributed, due to the immediate filling of the surface interstices and pores with the said gelationous material.

In accordance with the present invention, instead of the successive operations hereinbefore noted, that is to say, first saturating with a suitable hydrate-forming or similar material and thereupon immersing in a precipitating or coagulating liquid to fix the gelatinous medium in the members, a liquid mixture, which does not immediately gelatinize, is previously prepared and may consist, for example, of sodium silicate and an acid. The material to be impregnated is then saturated in this combined solution. It is to be understood, of course, that suitable proportions and conditions are to be maintained. For example, a quantity of the sodium silicate solution is prepared of one part of 40° B. sodium silicate solution and two parts of water, and this is poured into an equal quantity of previously diluted and cooled sulfuric acid made of 66° B. sulfuric acid diluted with two parts of water. Certain precautions should be observed in the mixing of these two solutions to prevent the immediate setting or lumping of silica hydrate. To this end, the sodium silicate solution is best poured in a thin stream into the dilute sulfuric acid with rapid stirring, the resulting mixture being, when first prepared, a substantially limpid liquid of uniform consistency.

Into the liquid mixture or hydrosol thus prepared, which gelatinizes only after an appreciable lapse of time, the diaphragm or other material is immersed until the liquid gelatinizes or sets therein, or it may be dipped therein at intervals until such time as the silica hydrate properly sets in the separator structure, the same providing within the structure a transparent, homogeneous and uniformly distributed, jelly-like, electrolytically conductive mass. Under the aforesaid conditions, some twenty to thirty minutes will be required for the liquid to properly set or gelatinize.

The member thus prepared is filled with a superior, homogeneous, ion transmitting medium, which is uniformly distributed, firmly retained, and will not be forced out by hydrostatic pressure. Members impregnated in the novel manner hereinbefore set forth will be of substantially uniform conductivity inasmuch as the ions will migrate freely and uniformly through all of the homogeneously filled voids. Said members, moreover, are more readily and rapidly produced in this manner and with minimum cost and waste of material. The excess sulfuric acid and the salts, such as sodium sulfate, may be retained or removed, as desired. Furthermore, to maintain the diaphragm in a moistened condition, should it be removed from the electrolyte in which it is used, sulfuric acid or other hygroscopic substances may be reintroduced, as is well understood.

I claim:

1. The method of producing a separator member, which consists in immersing a suitable material in a liquid mixture of a substance capable of forming a gelatinous medium and a coagulant therefor, said mixture gelatinizing within said material after an appreciable lapse of time.

2. The method of producing a separator member, which consists in immersing a suitable material in a liquid mixture of sodium silicate and a coagulant therefor, said mixture gelatinizing within said material after an appreciable lapse of time.

3. The method of producing a separator member, which consists in immersing a suitable material in a liquid mixture of sodium silicate and sulfuric or other acid, said mixture gelatinizing within said material after an appreciable lapse of time.

4. The method of producing a separator member, which consists in immersing a suitable material in a liquid mixture of diluted sodium silicate solution and diluted sulfuric acid, said mixture gelatinizing within said material after an appreciable lapse of time.

5. The method of producing a separator member, which consists in immersing a suitable material in a mixture composed of equal quantities of a solution of one part of 40° B. sodium silicate and two parts of water and of 66° B. sulfuric acid diluted with two parts of water.

6. The method of producing a separator member, which consists in immersing for approximately one-half hour a suitable material in a liquid mixture of sodium silicate and a coagulant therefor, said mixture gelatinizing within said material after an appreciable lapse of time.

7. The method of producing a separator member, which consists in immersing a suitable material in a mixture prepared by pouring a quantity of a solution consisting of one part of 40° B. sodium silicate solution and two parts of water, with rapid stirring and in a suitable stream, into an equal quantity of 66° B. sulfuric acid diluted with two parts of water.

8. The method of preparing a solution of sodium silicate and sulfuric acid to retard the gelatinizing, which consists in pouring a quantity of a solution consisting of one part of 40° B. sodium silicate solution and two parts of water, with rapid stirring and in a suitable stream, into an equal quantity of 66° B. sulfuric acid diluted with two parts of water.

Signed at New York, in the county of New York and State of New York, this 11th day of December, A. D. 1918.

CHARLES J. THATCHER.